D. HAYES.
CLASP HOOK.
No. 79,347. Patented June 30, 1868.
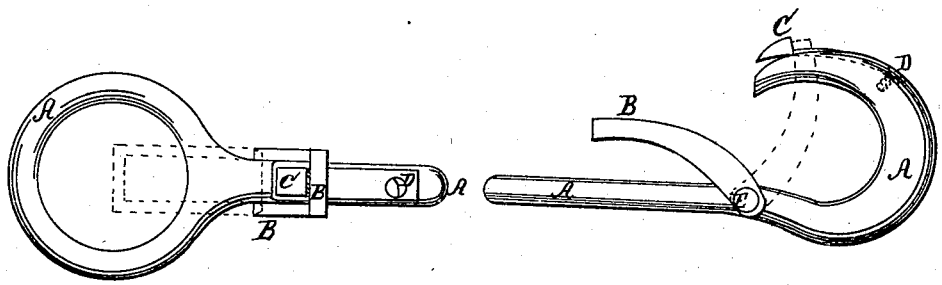
Witnesses
Jos. G. Holt
C. M. Bennett.
Inventor
Daniel Hayes

United States Patent Office.

DANIEL HAYES, OF CAMBRIDGE, MASSACHUSETTS.

Letters Patent No. 79,347, dated June 30, 1868.

IMPROVED CLASP-HOOK.

The Schedule referred to in these Letters Patent and making part of the same.

TO ALL WHOM IT MAY CONCERN:

Be it known that I, DANIEL HAYES, of Cambridge, in the county of Middlesex, and Commonwealth of Massachusetts, have invented a new and improved Clasp-Hook; and I do hereby declare that the following is a full and exact description of the same, reference being had to the accompanying drawings, and to the letters of reference marked thereon.

The nature of my invention consists in providing an iron hook with a clasp or bar.

To enable others skilled in the art to make and use my invention, I will proceed to describe its construction and operation.

I construct my iron hook in the known form represented by the letter A. The clasp or bar which I propose to attach, and represented by the letter B, is secured on both sides of said hook by a rivet, which is represented by the letter E. This clasp or bar can be passed over the point of the hook, and there remain secured by a spring, C. The said spring is attached to the outside of the hook by a screw or rivet, D.

What I claim as my invention, and desire to secure by Letters Patent, is—

The application to iron hooks of a clasp or bar, attached to said hook as aforesaid, and a spring attached to the outside of aforesaid hook, in the manner above set forth.

DANIEL HAYES.

Witnesses:
C. M. BENNETT,
JOS. G. HOLT.